US012646386B2

(12) United States Patent
Bennett, III et al.

(10) Patent No.: US 12,646,386 B2
(45) Date of Patent: Jun. 2, 2026

(54) SYSTEM AND METHOD FOR PLAY OF A SCRATCH-OFF LOTTERY TICKET GAME ACROSS MULTIPLE JURISDICTIONS

(71) Applicant: Scientific Games, LLC, Alpharetta, GA (US)

(72) Inventors: Joseph Waldo Bennett, III, Suwanee, GA (US); Ashley Ivery Gantt, Woodstock, GA (US)

(73) Assignee: Scientific Games, LLC, Alpharetta, GA (US)

( * ) Notice: Subject to any disclaimer, the term of this patent is extended or adjusted under 35 U.S.C. 154(b) by 335 days.

(21) Appl. No.: 18/481,707

(22) Filed: Oct. 5, 2023

(65) Prior Publication Data

US 2025/0118167 A1 Apr. 10, 2025

(51) Int. Cl.
*G07F 17/32* (2006.01)

(52) U.S. Cl.
CPC ........ *G07F 17/329* (2013.01); *G07F 17/3262* (2013.01)

(58) Field of Classification Search
CPC . G07F 17/3244; G07F 17/329; G07F 17/3262
See application file for complete search history.

(56) References Cited

U.S. PATENT DOCUMENTS 7,153,206 B2 12/2006 Bennett, III
7,186,180 B2 3/2007 Lathrop et al.
10,099,114 B2 * 10/2018 Rogers .................. G07F 17/329
2003/0157979 A1 * 8/2003 Cannon ................... G07F 17/42 463/16
2009/0197662 A1 * 8/2009 Wright ................ G07F 17/3244 463/31
2015/0206376 A1 7/2015 Reid et al.
2015/0310696 A1 10/2015 Mound
2016/0155301 A1 * 6/2016 Mound ............... G07F 17/3244 463/17
2017/0323526 A1 11/2017 Boothe et al.
2022/0134215 A1 5/2022 Bennett, III et al.

FOREIGN PATENT DOCUMENTS

CA 2967212 C * 9/2019 .......... G07F 17/329

OTHER PUBLICATIONS

EPO Search Report, Feb. 7, 2025.

* cited by examiner

*Primary Examiner* — Steven J Hylinski
(74) *Attorney, Agent, or Firm* — Dority & Manning, P.A.

(57) ABSTRACT

A method for implementing an instant lottery ticket game system played by a plurality of jurisdictions includes designating a first set of instant lottery tickets in a primary game that includes a fixed prize structure within each jurisdiction having a top prize and lesser prizes. A total number of supplemental prizes are defined and a set of supplemental lottery tickets is designated for printing with the instant lottery tickets. A subset of the supplemental lottery tickets is assigned to each of the first sets. Each supplemental prize is randomly assigned to one of the supplemental lottery tickets such that the supplemental prizes are randomly distributed throughout the first sets to be distributed to the jurisdictions. The first sets of instant lottery tickets with the supplemental lottery tickets contained therein are printed and distributed to the jurisdictions.

9 Claims, 3 Drawing Sheets

15 18

| Prize Level | Number of Prizes | Value per block of tickets |
|---|---|---|
| $10,000 | 6 | $60,000 |
| $500 | 14 | $7,000 |
| $100 | 617 | $61,700 |
| $50 | 2,487 | $124,350 |
| $25 | 5,720 | $143,000 |
| $20 | 15,869 | $317,380 |
| $15 | 8,603 | $129,045 |
| $10 | 27,453 | $274,530 |
| $5 | 18,325 | $91,625 |
| $4 | 45,810 | $183,240 |
| $2 | 228,822 | $457,644 |
| $1 | 366,181 | $366,181 |

: based on 3,360,000 $1 tickets per block of tickets

SYSTEM AND METHOD FOR PLAY OF A SCRATCH-OFF LOTTERY TICKET GAME ACROSS MULTIPLE JURISDICTIONS

FIELD OF THE INVENTION

The present invention generally relates to a system and method for implementing a scratch-off lottery ticket game, and more particularly to a method wherein lottery tickets eligible to win a top tier prize are randomly distributed across multiple jurisdictions.

BACKGROUND

"Scratch-off" or "instant-win" lottery tickets have enjoyed immense popularity in the lottery industry for decades. These games offer distinct advantages to the lottery authorities and are attractive to a broad spectrum of players.

The scratch-off lottery ticket games typically have a multi-tiered prize structure with relatively few prizes at the top tier level. The number of predetermined winning tickets in each tier increases as the prize tiers are further removed from the top prize tier level. The top prizes can be quite attractive to potential players and are often advertised extensively to draw players to the game.

Particularly in Europe and the U.S., multi-jurisdictional games exist wherein a common scratch-off lottery ticket game is played across multiple jurisdictions, such as separate countries in Europe or separate states in the U.S. These games have a common prize structure wherein the number and value of prizes (including the top tier prizes) are predetermined based on the payout of the game and the total number of tickets allocated to the game. For example, a game having five million tickets provided throughout the jurisdictions may have five top tier prizes (and a number of lesser tier prizes), whereas a game having twenty million tickets provided throughout the jurisdictions with the same payout percentage may have twenty top tier prizes (and a number of lesser tier prizes). All of the prizes (including the top tier prizes) are randomly distributed throughout the jurisdictions. Thus, it is possible that one or more of the jurisdictions may not receive a top tier prize ticket, or even that a single jurisdiction may receive all of the top tier prize tickets.

With the conventional practice, each jurisdiction is provided with a validation file for the lottery tickets provided to the jurisdiction, the validation file containing a record of each winning lottery ticket within the jurisdiction. Thus, the jurisdiction is aware of the number of top tier prize tickets that can possibly be won by patrons within the jurisdiction. This situation creates a dilemma for the jurisdictions. Specifically, a jurisdiction may offer lottery tickets to its citizens advertising the chance to win a top tier prize (e.g., "Win a top prize of $1 Million!") yet be aware (from the validation file) that no top tier prize tickets are even available for sale in the jurisdiction. Even if one or more top tier prize tickets were initially available and known to the jurisdiction, the same dilemma exists when the jurisdiction becomes aware that these winning tickets have been redeemed and no more top tier prize tickets exist in the jurisdiction but may still be available in other jurisdictions.

Certain lottery jurisdictions around the world (particularly in the U.S. and Europe) have adopted the practice of publicizing to patrons on a periodic basis (e.g., daily or weekly) the number of prizes remaining in each tier of the prize structure for individual scratch-off lottery ticket games. For various reasons (which may include consideration of the dilemma discussed above), these jurisdictions will also terminate the game when all of the top tier prizes have been awarded. For example, if a particular game has three top prizes worth $500,000 each, the game will end when the last of the three $500,000 prizes has been awarded. The unsold scratch-off lottery tickets remaining in the game are pulled from the point-of-sale locations and are typically destroyed.

The above-described practice is, however, disadvantageous in certain respects. Scratch-off lottery ticket games have a design payout based on play of a percentage of the complete run of lottery tickets in the game (the total number of tickets printed and made available for sale and play of the game). For example, a particular game may have a ticket run of ten million tickets with a designed payout of 50%, meaning that half of the money generated by ticket sales is paid out as prizes and the other half of the money constitutes lottery revenue for the jurisdiction. If a game is prematurely ended after the top prizes have been awarded, the payout percentage can be significantly increased to the detriment of the jurisdiction. For example, the game mentioned above having a ticket run of ten million tickets may be terminated after the sale of only two million of the tickets because the three top prizes were awarded. The lottery jurisdiction then loses the revenue from the sale of up to eight million additional tickets. The payout percentage at the early termination of the game may be, for example, 70% of the proceeds generated by sale of the two million tickets, which is significantly greater than the 50% designed payout.

U.S. Pat. No. 7,153,206 proposes an instant lottery ticket game structure includes a ticket validation file containing prize codes for at least some of the lottery tickets (i.e., at least the winning tickets). Provision is made for certain of the instant lottery tickets to have a variable redemption value by allowing the prize codes in the validation file to be changed under certain predetermined circumstances. These tickets, whether printed or electronically simulated, are provided with play indicia under a removable coating that indicates that the redemption value of that lottery ticket is variable. Using the host computer, a lottery administration can change the prize codes and therefore the redemption value of these instant lottery tickets according to the predetermined criteria such as the termination of a game. In some cases, a player can have the option to redeem an instant lottery ticket for a first value or wait until after termination of the game where a possibly higher redemption value might be assigned to that ticket due to the host computer randomly selecting that ticket to change its prize code to a greater value.

The industry, lottery jurisdictions, and public in general would benefit from additional improved methods and game systems to alleviate the dilemma and consequences discussed above that are faced by jurisdictions in a multi-jurisdictional game.

SUMMARY

Objects and advantages of the invention will be set forth in part in the following description, or may be obvious from the description, or may be learned through practice of the invention.

In accordance with aspects of the invention, a method is provided for implementing an instant lottery ticket game system played by a plurality of jurisdictions. The jurisdictions may be, for example, a state, region, or other municipality that has authorized the play of lottery games within its borders or boundaries. For example, in the United States, each state may be considered as a separate jurisdiction. In Europe, each country may be considered as a separate jurisdiction, or regions within a country may be considered as separate jurisdictions. The lottery game systems are generally provided to the jurisdictions by a third-party game provider that may also administer certain administrative and accounting aspects of the games.

The method includes designating a first set of instant lottery tickets in a primary game to be printed for each of the jurisdictions, wherein each of the first sets comprises a predetermined fixed prize structure having a defined number of top prizes and a defined number of lesser prizes in the primary game. The instant lottery tickets may be paper or electronically printed (virtual) scratch-off lottery tickets. These first sets of instant lottery tickets may share a game theme, with each of the first sets within a jurisdiction having a predetermined fixed prize structure for the primary game that includes a defined number of top prizes and a defined number of lesser prizes. The fixed prize structure may be a multi-tiered structure that includes at least one top tier prize and a plurality of prizes at lower-tier prize levels that decrease in value from the top tier prize.

The method includes defining a total number of supplemental prizes that are separate from the fixed prize structures and designating a set of supplemental lottery tickets associated with the supplemental prizes, wherein a total number of the supplemental lottery tickets is at least equal to the total number of the supplemental prizes.

The method includes assigning a subset of the supplemental lottery tickets to each of the first sets of instant lottery tickets provided to the respective jurisdictions. This assigning process may be done randomly or according to a defined distribution pattern. After assigning the supplemental lottery tickets, the method includes randomly assigning each of the supplemental prizes to one of the supplemental lottery tickets such that the supplemental prizes are randomly distributed throughout the first sets to be distributed to the jurisdictions. The method includes printing and distributing the first sets of instant lottery tickets with the supplemental lottery tickets located therein to the jurisdictions.

In a particular embodiment of the method, the supplemental prizes include a total number of supplemental top prizes at least equal in number to a total number of the top prizes in all of the first sets of instant lottery tickets. The supplemental top prizes can be equal to, greater than, or less than the value of the top prizes in the primary game.

In certain embodiments, the supplemental prizes include a plurality of lesser prizes.

The number of supplemental lottery tickets assigned to each of the subsets provided to the respective jurisdictions may be determined randomly or based on a pro rata number of the instant lottery tickets provided to each of the jurisdictions. Thus, a jurisdiction that takes a greater percentage of the instant lottery tickets in the primary game will receive a greater percentage of the supplemental lottery tickets.

In a further embodiment, the supplemental lottery tickets and the instant lottery tickets may have a same outward appearance to a player such that the player and vendors are not aware of the identity of the supplemental lottery tickets until indicia identifying the supplemental lottery tickets is revealed to the player upon removing a scratch-off coating from a play area of the supplemental lottery ticket.

The method may include generating a validation file for each of the first sets of instant lottery tickets, the validation file containing a record for each winning instant lottery ticket in the first set with information to authenticate and allow redemption of the winning tickets in the primary game. These validation files are generally provided by the lottery provider to the individual jurisdictions wherein they are used for various functions, including ticket validation, redemption, and accountability. These validation files for the primary game tickets, however, do not contain a record of the supplemental lottery tickets that were seeded into the first set of instant lottery tickets. This embodiment may include the game provider generating a universal validation file that contains a record for at least each of the winning supplemental lottery tickets. At least each winning supplemental lottery ticket contains a code thereon that is linked to its record in the universal validation file. The universal validation file can be maintained by a lottery game provider or other third party to validate the supplemental lottery tickets in a validation process that is separate from a validation process conducted by the jurisdictions on winning instant lottery tickets in the first sets. In certain embodiments, one or more of the supplemental lottery tickets are non-winning tickets and do not have a supplemental prize assigned thereto. In this scenario, it is not necessary for the universal validation file to include a record of these non-winning supplemental lottery tickets.

The present invention also encompasses an instant lottery ticket game system for play in a plurality of jurisdictions. The system includes a first set of instant lottery tickets in a primary game for each of the jurisdictions, wherein each of these first sets comprises a predetermined fixed prize structure having a defined number of top prizes and a defined number of lesser prizes. The system includes a defined total number of supplemental prizes, and a set of supplemental lottery tickets associated with the supplemental prizes. A subset of the supplemental lottery tickets is seeded into each of the first sets of instant lottery tickets in the primary game provided to the respective jurisdictions. Each of the supplemental prizes is randomly assigned to one of the supplemental lottery tickets such that the supplemental prizes are randomly distributed throughout the plurality of jurisdictions in the primary game.

In one embodiment of the system, the supplemental prizes include a total number of supplemental top prizes at least equal in number to a total number of the top prizes in the primary game. This embodiment may also include a plurality of lesser supplemental prizes.

In the system, a total number of the supplemental lottery tickets within each of the subsets may be randomly determined or based on a pro rata number of the instant lottery tickets in the primary game provided to each of the jurisdictions.

In a particular embodiment of the system, the supplemental lottery tickets and the instant lottery tickets comprise a same outward appearance to a player, and wherein indicia identifying the supplemental lottery tickets is under a scratch-off coating in a play area of the supplemental lottery ticket.

Embodiments of the system may include a validation file for each of the first sets of instant lottery tickets in the primary game, the validation file containing a record for each winning instant lottery ticket in the first set of instant lottery tickets but being void of a record of the supplemental lottery tickets seeded into the first sets of instant lottery tickets. These embodiments may further include a universal validation file for the supplemental lottery tickets, the universal validation file containing a record for each winning supplemental lottery ticket. Each winning supplemental lottery ticket includes a code thereon linked to its record in the universal validation file, wherein the universal validation file is maintained by a lottery game provider or other third party for validation and redemption of the winning supplemental lottery tickets.

In an embodiment of the system, one or more of the supplemental lottery tickets are non-winning tickets and do not have a supplemental prize assigned thereto and may or may not have an associated record in the universal validation file.

The instant lottery tickets and the supplemental lottery tickets may be paper or electronic scratch-off lottery tickets having game play indicia under a removable scratch-off coating.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Generally, the present disclosure is directed to an instant lottery ticket game system 10 and method 100 (FIG. 4) that facilitate continued play (including sale) of the tickets that remain after the top prize(s) in the primary game have been awarded. The system and method may be implemented with paper scratch-off lottery tickets or electronic scratch-off lottery tickets that are presented to and played by a patron via a smart device.

Figures 1, 2:
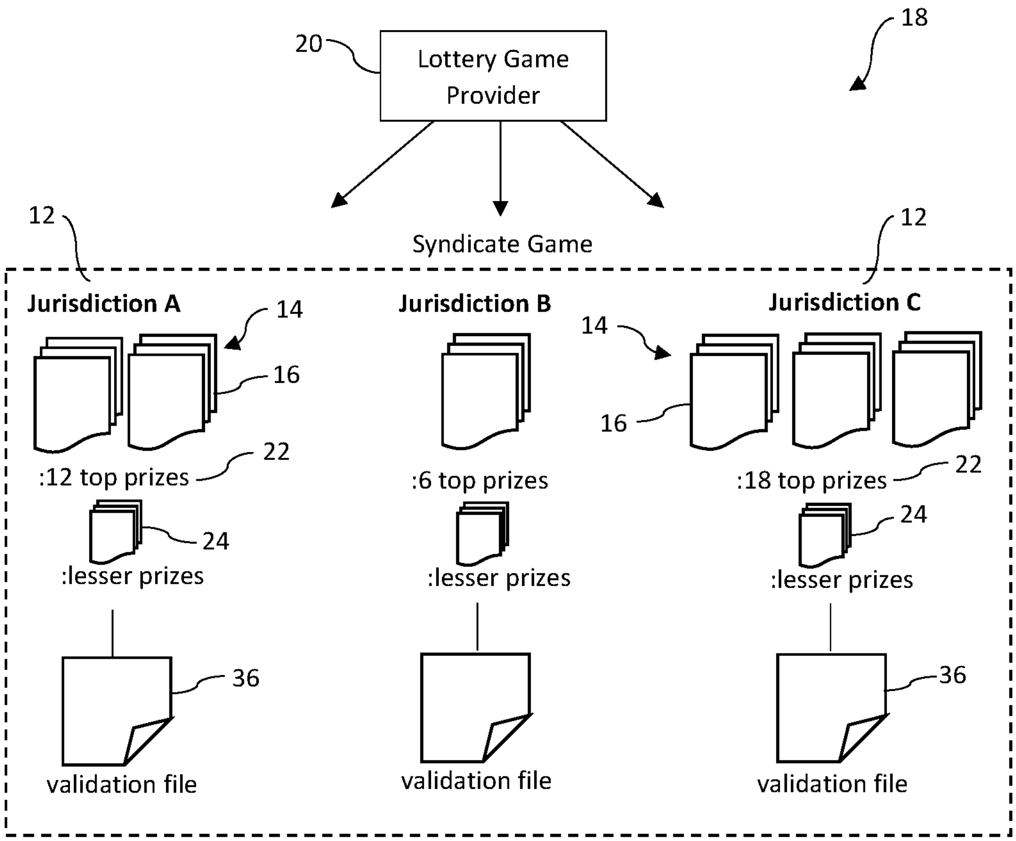
FIG. 1 is a diagram of primary instant ticket lottery game system provided by a game provider to a plurality of jurisdictions.
FIG. 2 is a table representing a fixed multi-tiered prize structure for a primary scratch-off lottery ticket game that may be embodied in the system of FIG. 1.

Referring to FIG. 1, the present method and system are implemented in a plurality of different jurisdictions 12, which may be, for example, a state, region, or other municipality that has authorized the play of lottery games within its borders. The lottery games are generally provided to the jurisdictions 12 by a third-party game provider 20 that may also administer certain administrative and accounting aspects of the games. An example of a game provider is Scientific Games having its global headquarters in Alpharetta, Georgia, USA.

The present method and system include designating a first set 14 of instant lottery tickets 16 in a primary ("syndicate") game 18 to each of the jurisdictions 12, which may be paper or electronic scratch-off lottery tickets. These first sets 14 of instant lottery tickets may share a game theme, such as a sports or holiday theme, and art typically printed and provided to the jurisdictions 12 in "blocks" having a fixed number of tickets and a fixed, multi-tiered prize structure as depicted in FIG. 2. For example, FIG. 2 depicts a block of the lottery tickets in the primary game 18 having 3,360,000 tickets with the multi-tiered prize structure 15 having six top tier prizes and a plurality of lesser prizes. FIG. 1 depicts that Jurisdiction A will be provided with a first set 14 of the lottery tickets 16 in the primary game comprised of two blocks of the ticket structure depicted in FIG. 2. Thus, the first set 14 of the lottery tickets 16 for Jurisdiction A includes 12 top prizes 22 and a plurality of lesser prizes 24. Similarly, the first set 14 of the lottery tickets 16 in the primary game to be provided to Jurisdiction B comprises a single block having six top prizes 22 and a plurality of lesser prizes 24. The first set 14 of the lottery tickets 16 in the primary game to be provided to Jurisdiction C comprises three blocks having 18 top prizes 22 and a plurality of lesser prizes 24.

Figure 4:
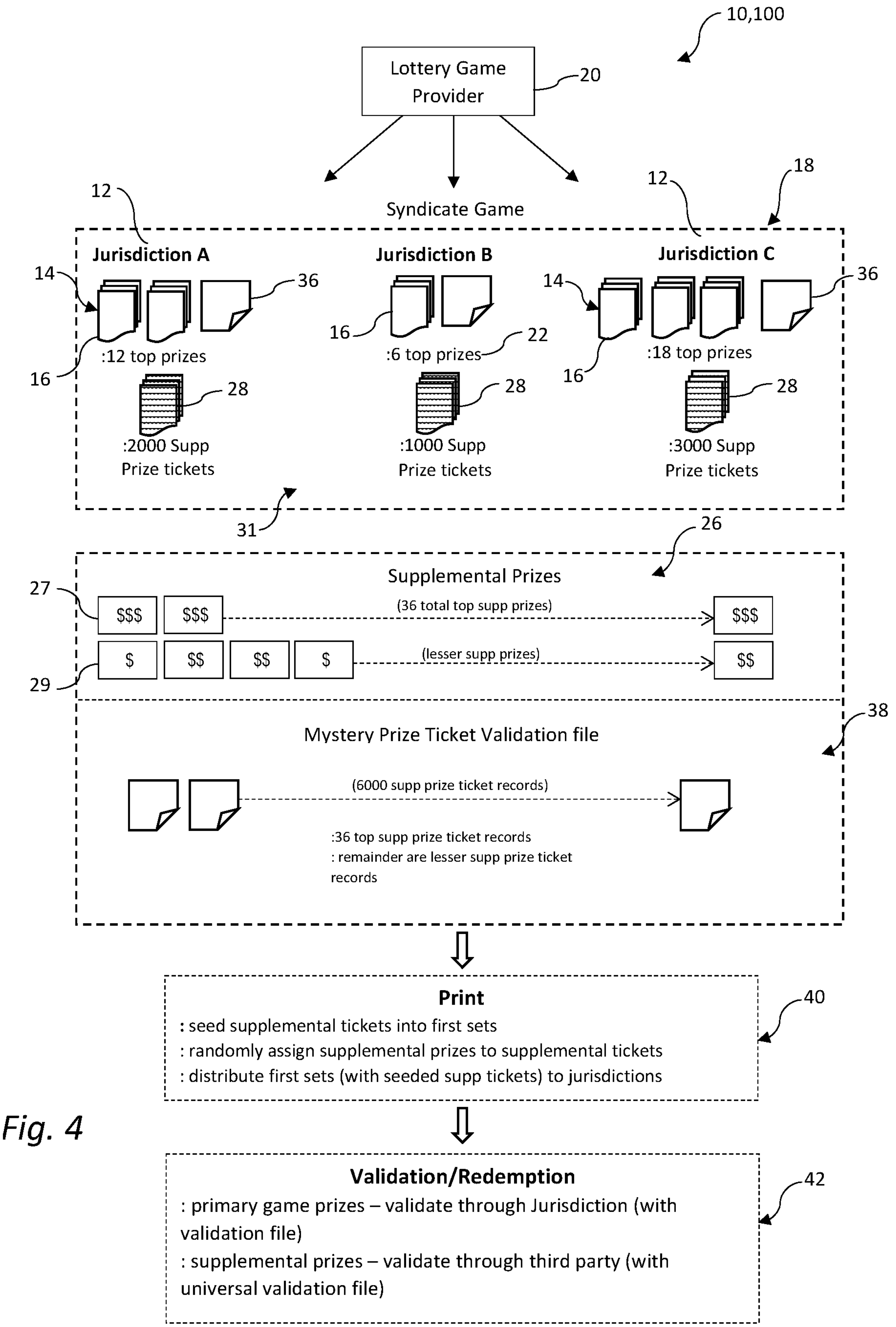
FIG. 4 depicts a system and method for play of a primary lottery ticket game and supplemental lottery ticket game in accordance with aspects of the invention.

Referring to FIG. 4, the system 10 and method 100 include defining a total number of supplemental prizes 26 that are separate from the fixed prize structures 15 in the primary game 18 and are common to all of the jurisdictions. These supplemental prizes 26 may have a monetary value, or any other type of value. A set 31 of supplemental lottery tickets 28 associated with the supplemental prizes 26 are also generated and distributed to the jurisdictions, as described in more detail below. The total number of the supplemental lottery tickets 28 is at least equal to the total number of the supplemental prizes 26 such that each supplemental prize 26 has a supplemental lottery ticket 28 associated therewith. In certain embodiments, one or more of the supplemental lottery tickets 28 will have no value.

Still referring to FIG. 4, a subset of the supplemental lottery tickets 28 is seeded into each of the first sets 14 of instant lottery tickets to be provided to the respective jurisdictions A-C in the primary game. This seeding process may be done randomly or according to a defined distribution pattern at the time of printing or otherwise producing the lottery tickets 16, 28. For example, once it is determined how many supplemental lottery tickets 28 are to be provided to a particular jurisdiction, the printing process can be controlled to print and randomly seed these supplemental tickets 28 into the production runs for the tickets 16 in the primary game.

At a time subsequent to the seeding of the supplemental lottery tickets 28 into the first sets 14 of the primary game tickets 16, the method 100 includes randomly assigning each of the supplemental prizes 26 to one of the supplemental lottery tickets 28. In this manner, the supplemental prizes 26 are, in essence, randomly distributed throughout the plurality of jurisdictions A-C. Thus, the individual jurisdictions may or may not be aware of the total number of supplemental lottery tickets 28 that are contained in their respective first set 14 of primary game tickets 16, but the jurisdictions are not aware of the particular supplemental prize 26 assigned to any specific supplemental lottery ticket 28. In addition, if the supplemental lottery tickets 28 were randomly seeded into the first set 14, the individual jurisdiction is also not aware of the location of the supplemental lottery tickets 28 within the first set 14 of primary game tickets.

Still referring to FIG. 4, in a particular embodiment of the method 100, the supplemental prizes 26 include a total number of supplemental top prizes 27 at least equal in number to a total number of the top prizes 22 in all of the first sets 14 of instant lottery tickets in the primary game 18. Thus, in the embodiment of FIG. 4, the supplemental prizes 26 would include at least thirty-six top prizes 27, which is equal to the total number of top prizes 22 in the primary game 18. The supplemental top prizes 27 can be equal to, greater than, or less than the value of the top prizes 22 in the primary game 18.

It should be appreciated that, in another embodiment, the supplemental prizes 26 may include a single top prize 27 having a greater value than the top prizes 22 in the fixed prize structures of the first sets 14.

As depicted in FIG. 4, the supplemental prizes 26 can include a plurality of lesser prizes 29 also assigned to respective supplemental lottery tickets 28 seeded throughout the first sets 14 of tickets in the primary game 18. Thus, in this embodiment, the total number of the supplemental prizes 26 may be greater than the total number of top prizes 22 in the primary game 18.

The number of supplemental lottery tickets 28 assigned to each of the subsets 14 provided to the respective jurisdictions may be determined in various ways. In one example, this number may be based on a pro rata number of the instant lottery tickets 16 provided to each of the jurisdictions in the primary game 18. Thus, a jurisdiction that purchases a greater percentage of the instant lottery tickets 16 in the primary game 18 will receive a greater percentage of the supplemental lottery tickets 28. For instance, in FIG. 4, Jurisdiction A will get twice the number of supplemental lottery tickets 28 than Jurisdiction B, and Jurisdiction C will get three-times the number of supplemental lottery tickets 28 than Jurisdiction B.

In another embodiment, the number of supplemental tickets assigned to each of the subsets 14 provided to the respective jurisdictions may be randomly determined.

The algorithms and systems used for designing scratch-off lottery ticket games are well-known to lottery ticket providers. These systems and their highly secure control processors can be programmed to perform the steps discussed above, including determining the correct number of supplemental lottery tickets 28 for each jurisdiction and performing the random and secret assignment of the supplemental prizes 27, 29 to the tickets 28. Once the random assignment of the supplemental prizes 27, 29 has been made, the highly secure printing processors will ensure that the supplemental lottery tickets 28 will be randomly seeded and printed within the correct sets 14 of instant tickets 16 for the respective jurisdictions A-C, as depicted by steps 40 in FIG. 4.

Figure 3A:
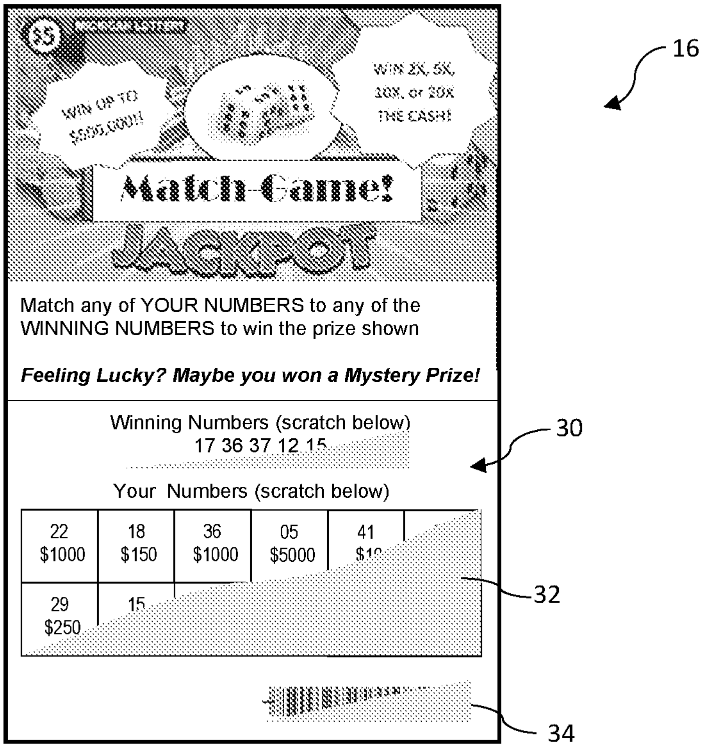
FIGS. 3A and 3B depict examples of scratch-off lottery tickets that may be played in a primary game and supplemental game in accordance with aspects of the invention.
Figure 3B:
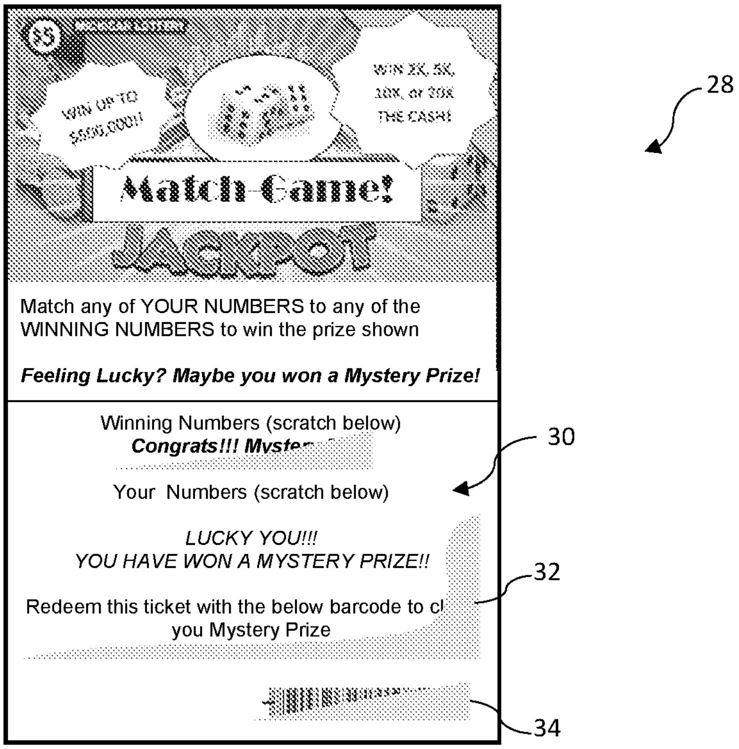

Referring to FIGS. 3A and 3B, so that the players and vendors have no knowledge of the nature of the lottery tickets at the time of purchase, the supplemental lottery tickets 28 and the instant lottery tickets 16 may have the same outward appearance. The player (and ticket vendor) is only made aware that the ticket they purchased is a supplemental lottery ticket 28 (with a prize 27, 29 assigned thereto) upon removal of the scratch-off-coating 32 from over the play indicia 30 that identifies the supplemental lottery ticket and provides instructions for redeeming the supplemental lottery ticket 28.

Referring again to FIG. 4, the method 100 may include generating an electronic validation file 36 for each of the first sets 14 of instant lottery tickets 16 in the primary game 18. The generation, use, and purpose of electronic validation files 36 is well-known in the industry. Generally, the validation file 36 includes an electronic record at least for each of the winning instant lottery tickets 16 to facilitate authentication and redemption of the winning tickets in the primary game. The tickets 16 generally include a code (depicted in FIGS. 3A-3B under a scratch-off-coating) that links the ticket to its respective record in the validation file 38. The validation files 38 are also used for accountability purposes between the lottery game provider and the jurisdiction, and for various other reasons. These validation files 38 are generally generated and provided by the lottery provider 20 to the individual jurisdictions 12.

The validation files 36 for the primary game tickets 16 do not, however, contain a record or information of the winning supplemental lottery tickets 28 that were seeded into the first sets 14 of instant lottery tickets 16 in the primary game. Thus, none of the jurisdictions are aware of the location of the supplemental lottery tickets 28.

For authenticating and redemption of the supplemental lottery tickets 28, the game provider 20 may generate a universal validation file 38 that contains a record for at least each of the winning supplemental lottery tickets 28 (and may contain a record for non-winning supplemental lottery tickets 28). Referring to FIG. 3B, the winning supplemental lottery tickets 18 contain a code 34 thereon that is linked to its respective record in the universal validation file 38. The universal validation file 38 may not be provided to the individual jurisdictions and validation of the supplemental lottery tickets 28 presented for redemption by players is conducted directly by the validation game provider 20 or another third party via a validation process that is separate from the process used to validate winning instant lottery tickets 16 in the primary game 18.

In certain embodiments, one or more of the supplemental lottery tickets 28 are non-winning tickets and do not have a supplemental prize 26 assigned thereto. In this scenario, it is not necessary for the universal validation file 38 to include a record of these non-winning supplemental lottery tickets 28.

As depicted at steps 42 in FIG. 4, the method includes providing means to validate the winning instant lottery tickets 16 and the supplemental lottery tickets 28 that are presented by players for redemption. As depicted in FIGS. 3A and 3B, instructions are provided on winning instant tickets 16 and winning supplemental tickets 28 on how to validate and redeem the tickets. The winning instant tickets 16 can be validated through the jurisdiction via the validation files 36. The winning supplemental tickets 28 can be validated by the lottery provider or another third party via the universal validation file in a validation process conducted separately from the jurisdiction's validation process for the tickets 16. However, after receipt of validation confirmation from the lottery provider or other third party, the supplemental prizes can be awarded to the player by the jurisdiction in which the supplemental ticket was sold.

Those skilled in the art appreciate that the present methods and systems may be implemented by conventional technology that may include servers, computers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An instant lottery ticket game system for play in a plurality of jurisdictions, comprising:

a first set of instant lottery tickets in a primary game for each of the jurisdictions, wherein each of the first sets of instant lottery tickets comprises a predetermined fixed prize structure having a defined number of top prizes and a defined number of lesser prizes;

a defined total number of supplemental prizes;

a set of supplemental lottery tickets, wherein a total number of the supplemental lottery tickets is at least equal to the total number of the supplemental prizes;

a subset of the supplemental lottery tickets seeded into each of the first sets of instant lottery tickets in the primary game provided to the respective jurisdictions; and each of the supplemental prizes randomly assigned to one of the supplemental lottery tickets such that the supplemental prizes are randomly assigned to supplemental lottery tickets seeded throughout the plurality of jurisdictions in the primary game.

2. The system of claim 1, wherein the supplemental prizes include a total number of supplemental top prizes at least equal in number to a total number of the top prizes in the primary game.

3. The system of claim 2, wherein the supplemental prizes include a plurality of prizes of a lesser value than the supplemental top prizes.

4. The system of claim 1, wherein a total number of the supplemental lottery tickets within each of the subsets is randomly determined or based on a pro rata number of the instant lottery tickets in the primary game provided to each of the jurisdictions.

5. The system of claim 1, wherein the supplemental lottery tickets and the instant lottery tickets comprise a same outward appearance to a player, and wherein indicia identifying the supplemental lottery tickets is under a scratch-off coating in a play area of the supplemental lottery ticket.

6. The system of claim 1, further comprising a validation file for each of the first sets of instant lottery tickets in the primary game, the validation file containing a record for each winning instant lottery ticket in the first set of instant lottery tickets but void of a record of the supplemental lottery tickets seeded into the first set of instant lottery tickets, the validation files provided to each respective jurisdiction.

7. The system of claim 6, further comprising a universal validation file for the supplemental lottery tickets, the universal validation file containing a record for each winning supplemental lottery ticket, wherein each winning supplemental lottery ticket comprises a code thereon linked to its record in the universal validation file, wherein the universal validation file is maintained by a lottery game provider or other third party.

8. The system of claim 7, wherein one or more of the supplemental lottery tickets are non-winning and do not have a supplemental prize assigned thereto.

9. The system of claim 1, wherein the instant lottery tickets and the supplemental lottery tickets comprise paper or electronic scratch-off lottery tickets having game play indicia under a removable scratch-off coating.

* * * * *